United States Patent [19]

Khoury et al.

[11] Patent Number: 4,752,857
[45] Date of Patent: Jun. 21, 1988

[54] THIN TAPE FOR DIELECTRIC MATERIALS

[75] Inventors: Issam A. Khoury, Southboro; Robert H. Heistand, II, East Walpole; Iwao Kohatsu, Lexington, all of Mass.

[73] Assignee: The Dow Chemical Company, Midland, Mich.

[21] Appl. No.: 897,954

[22] Filed: Aug. 19, 1986

Related U.S. Application Data

[63] Continuation-in-part of Ser. No. 761,929, Aug., 1985, Pat. No. 4,641,221.

[51] Int. Cl.$^4$ ............................. H01G 4/10; F27B 9/04
[52] U.S. Cl. ............................. 361/321; 252/62.3 BT; 264/66
[58] Field of Search ............... 29/25.42; 361/311, 320, 361/321, 328; 501/136; 252/62.3 BT; 264/66

[56] References Cited

U.S. PATENT DOCUMENTS

| | | | |
|---|---|---|---|
| 2,468,233 | 4/1949 | Prichard | 264/217 X |
| 2,966,719 | 1/1961 | Park | 264/66 |
| 3,004,197 | 10/1961 | Rodriguez et al. | 361/305 |
| 3,536,508 | 10/1970 | Short et al. | 106/173.1 |
| 4,641,221 | 2/1987 | Khoury et al. | 361/321 |

*Primary Examiner*—Donald Griffin
*Attorney, Agent, or Firm*—M. F. Zuckerman

[57] ABSTRACT

An improved, flexible, strong, thin precursor green tape for dielectric ceramics is described. The tape is prepared from a cellulosic resin of specific characteristics. The tape is especially useful in the preparation of multilayer capacitors and related electronic devices.

19 Claims, No Drawings

THIN TAPE FOR DIELECTRIC MATERIALS

CROSS-REFERENCE TO RELATED APPLICATION

This is a continuation-in-part of application Ser. No. 761,929, filed Aug. 2, 1985, and now U.S. Pat. No. 4,641, 221 issued Feb. 3, 1987.

BACKGROUND OF THE INVENTION

The present invention is directed to ceramic precursor tapes and their use in the manufacture of electronic components.

The preparation of dielectric ceramics is similar to the preparation of other ceramics in that a green, i.e., unfired, piece is first prepared and then fired to obtain a desired ceramic article. In the preparation of multilayer capacitors, preformed sheets, films or strips of green, dielectric material are coated with a pattern of an electrode ink, stacked, compressed and fired to provide a monolithic multilayer capacitor. For a given dielectric material, capacitance is a function of thinness, i.e., capacitance increases as the thickness of a dielectric layer decreases. Thus, it is possible to reduce capacitor size while simultaneously increasing the capacitance of the capacitor. Theoretically, there is almost no limit to the smallness of multilayer capacitors. However, practical size limitations exist due to the nature of green tapes and the problems associated with their handling.

The physical properties of green tapes become a critical factor in the preparation of thinner, higher capacitance, dielectric layers. Lack of strength makes green tapes susceptible to tearing. Lack of flexibility leads to cracking. Thus, in the preparation of multilayer capacitors and similar devices having thinner dielectric layers, it is essential to produce a thin green tape strong enough to be free-standing and capable of maintaining its physical integrity throughout the processes of ink screen printing, laminating and dicing.

Tapes typically are prepared by tape-casting or knife-coating a slip onto a nonporous carrier. The slip typically contains a ceramic powder, a binder, a wetting agent, a solvent, and a plasticizer, depending on the specific application. A wide variety of materials are used as the binder. For example, Thompson, J. J., in *Ceramic Bulletin*, Vol. 42, pp. 480-1 (1963), discloses the use of organic binders such as methylcellulose, starch derivatives, or preferably polyvinyl alcohol. U.S. Pat. No. 2,736,080 discloses the use of cellulose or cellulose pulp in the production of dielectric sheets having an approximate thickness of 5 mils. U.S. Pat. No. 2,759,854 discloses the use of high viscosity ethylcellulose and an ester gum binder in the preparation of supported green films having a thickness in the neighborhood of 3 mils or less. UK Pat. No. 1,493,102 discloses a process for the preparation of glass microchanneled bodies by dipping a filament into a solution of a ceramic powder and a polymeric film-former. Polyvinyl alcohol, polystyrene, ethylcellulose, cellulose nitrate, and dialkoxy polytitanates are listed as suitable film-formers. U.S. Pat. No. 3,495,996 discloses the use of natural gums, synthetic resins, cellulose resinous materials, and the like, in the preparation of encapsulated electronic devices. U.S. Pat. No. 3,536,508 discloses the use of binders such as solid ethylcellulose resins, solid polymers of an acrylate or methacrylate ester of a 1-4 carbon aliphatic alcohol, polyvinyl alcohol or polyvinyl butyral for the preparation of flexible green sheets having a thickness of about 4 mils.

U.S. Pat. No. 2,966,719 discloses the preparation of a green ceramic tape having a thickness as thin as on the order of 1 mil using binders such as cellulose acetate butyrate resin compatibly plasticized with dimethyl phthalate or tricresyl phosphate, or polyacrylate esters. However, the preparation of said tape requires that the tape be cast onto a flexible support. U.S. Pat. No. 3,619,220 discloses the preparation of a fired ceramic having a thickness of approximately 1 mil using ethylcellulose as a binder. However, the product is fired on a glass plate and is not taught to be free-standing.

U.S. Pat. No. 2,486,410 discloses an early process for the preparation of flat ceramic plates using binders such as ethylcellulose. The resulting tapes are described as being "leather-hard."

U.S. Pat. No. 3,189,978 discloses a process for the preparation of multilayer circuits by first preparing a plurality of dry, thin films, each comprising finely divided ceramic particles and a heat-volatile binder therefor. Said patent discloses that a film having a thickness of about 1 mil is flexible and strippable from the carrier upon which it is cast. The binder is vinyl chloride-acetate copolymer. A metal-containing ink is applied to the previously described film. The metal ink is taught to contain binders such as methylcellulose, ethylcellulose, or nitrocellulose. The patent broadly teaches that the thickness of unfired ceramic films may be varied between 0.5 and 20 mils.

U.S. Pat. No. 3,004,197 discloses a process of making a ceramic capacitor by forming a self-sustaining sheet comprising a ceramic material and a plastic polymer, metallizing a portion of the sheet, winding the metallized sheet into a coil and firing. The fired, coiled dielectric is taught to have a thickness of 3 mils (about 75 microns) or less. Cellulosic resins are broadly taught to be useful as the film-forming plastic polymer.

U.S. Pat. No. 4,447,853 discloses the preparation of multilayer capacitors having individual dielectric layers of from 10 to 30 microns in thickness. The only statement in said patent regarding the binder is that "the manufacturing method of the multilayer capacitor is the same as the prior art method."

Heretofore, a flexible, strong, thin, free-standing, ceramic green tape having a thickness of less than about 25 microns (about 1 mil) has not been disclosed. Such a tape would be desirable for the preparation of improved multilayer capacitors and relate devices.

SUMMARY OF THE INVENTION

The present invention is such a green ceramic precursor tape which comprises a free-standing, flexible layer having a thickness not qreater than about 25 microns and prepared from a slip composition having:

(a) a dielectric component in an amount sufficient to provide the resulting thin film with the desired dielectric properties;

(b) a binder having at least one cellulosic resin in an amount sufficient to bind the dielectric material into the thin film upon removal of the solvent; and (c) a solvent in an amount sufficient to solubilize the dielectric component and the binder and to provide the slip composition with the viscosity required to form the thin film.

The dielectric component serves to furnish the raw material, which on high temperature processing forms the ceramic body. The dielectric component is selected to provide the physical, thermal, electrical and chemical properties which are desired in the finished ceramic. For example, titanates, especially barium titanate, exhibit a very high dielectric constant; therefore, titanates are the preferred dielectrics in green tapes from which capacitors of high capacitance are prepared.

Generally, the binder serves to retain the dielectric component in an undisrupted position after the solvent is evaporated from the slip and, together with the solvent, facilitates the formation of dry, flexible green tapes which are free of pinholes, cracks and other imperfections.

The solvent functions to solubilize all components of the slip which are volatile under ceramic firing conditions. The solvent is also useful in controlling the viscosity of the slip, thereby facilitating the formation of thin films.

Surprisingly, the use of slip compositions as described herein, allows the production of improved free-standing, flexible, thin, green tapes having a thickness not greater than 25 microns (about 1 mil). The present invention includes capacitors prepared using such green tapes.

DETAILED DESCRIPTION OF THE INVENTION

According to the present invention, a slip comprising a dielectric component, a binder, a solvent, optionally a surfactant, and optionally a plasticizer, advantageously is prepared. Conventional methods of formulating or compounding this slip can be employed so long as it is thoroughly mixed to form a homogeneous suspension. The prepared slip may then be deaired by agitating the slip in a vacuum. After deairing, the slip may be filtered to remove any large pieces of dielectric component or undissolved binder that may be present. Both air bubbles and large solid particles can cause defects in the cast tape or fired product.

The slip is deposited on a nonporous carrier using known methods such as, for example, the falling sheet method as taught in U.S. Pat. No. 3,717,487, or the well-known tape-casting, doctor blade or knife-coating techniques. For example, U.S. Pat. Nos. 3,189,978; 2,486,410; and 2,966,719 describe methods of casting green tapes. In general, the tape-casting technique involves applying a thin layer of a slip to a flexible or nonflexible, nonporous carrier, such as a smooth glass plate or plastic strip. The carrier coated with the slip is passed under a doctor blade, with the gap under the blade controlling the thickness of the coating. After being spread on the carrier, the slip is dried to remove its volatile constituents. Drying is accomplished by exposing the slip to air at room temperature or by heating the slip in an oven, optionally under forced air circulation. The resulting dried film can be stripped from the carrier, thereby yielding a free-standing green tape. Thus, the above process can generally be described by applying a thin layer of a coating to a flexible or nonflexible, nonporous carrier, controlling the thickness of the coating, drying the coating/carrier, and removing the coating (green tape) from the carrier.

The dielectric component of the slip can be a dielectric powder, a material which upon firing is converted into a dielectric, or a mixture thereof. Dielectric materials are well-known, and a wide variety of dielectric materials can be employed. Examples of dielectric powders include powders consisting mainly of alumina, zircon, aluminum silicate, magnesium aluminum silicate, aluminum nitride, beryllia, zirconium dioxide, titanium dioxide, magnesium silicate, and, preferably, barium titanate. Typically, the ceramic component is ground to a fine particle size ranging from 0.05 to 5 microns. Preferably, dielectric powders having an average particle size of from 0.5 to 2 microns are employed. Preferably, the dielectric component constitutes greater than 75 percent by weight of the slip composition, excluding the weight of the solvent.

The binder may be any one or a combination of cellulosic resins. Cellulosic resins are derived from and have the polymeric "backbone" of cellulose, which is a naturally occurring polymer. Cellulose has a structure of repeating anhydroglucose units, each unit of which contains three hydroxyl sites. Reactions at the hydroxyl sites yield derivatives generally classified as cellulosic resins. For example, esterifying the hydroxyl groups produces cellulose ethers. Preferred binders include cellulose nitrates, cellulose esters, alkyl cellulose ethers, hydroxyalkylcellulose ethers, alkyl hydroxylalkylcellulose ethers and dialkylene glycol cellulose ethers. More preferred binders include alkylcellulose ethers and hydroxyalkylcellulose ethers. The most preferred binders include ethylcellulose, 2-hydroxyethylcellulose, and thermoplastic methylcellulose. Thermoplastic methylcellulose is prepared according to the methods described in U.S. Pat. Nos. 3,070,451; 2,965,508; 2,958,607; 2,849,328; and 2,839,419. Preferred ethylcellulose binders have a viscosity greater than about 40 centipoise. Green tapes of less than 25 microns thickness maintain their structural integrity when prepared from ethylcellulose binders having a viscosity of greater than about 40 centipoise; whereas tapes of this thinness with lower viscosity ethylcellulose binders tend to crack. More preferred ethylcellulose binders have a viscosity from 40 to 110 centipoise, the viscosity being that of a 5 weight percent solution measured at 25° C. in an Ubbelohde viscometer with a solvent which is 80 weight percent toluene and 20 weight percent ethanol. Preferred ethylcellulose binders are ethylcellulose having an ethoxyl content of from 44 to 53 weight percent. More preferred ethylcellulose binders are ethylcellulose having an ethoxyl content of from 47.4 to 49.5 weight percent. The most preferred ethylcellulose binder is an ethylcellulose having an ethoxyl content of from 48 to 49.5 weight percent. Mixtures of binders can be employed. Premium standard ETHOCEL® 45 and ETHOCEL® 100 (ETHOCEL is a trademark of The Dow Chemical Company) brand ethylcellulose are the most preferred binders, as they have a low sodium chloride content and meet the requirements specified hereinabove; ETHOCEL® 45 and ETHOCEL® 100 are available from The Dow Chemical Company. Premium standard ETHOCEL® 45 has an ethoxyl content of 48.0 to 49.5 weight percent and a viscosity range of 41 to 49 centipoise, measured as described herein above. Premium standard ETHOCEL® 100 has an ethoxyl content of 48.0 to 49.5 weight percent and a viscosity range of 90 to 110 centipoise, measured as described above. Other ETHOCEL® binders which can be used are: ETHOCEL® 7 ETHOCEL which has an ethoxyl content of 48.0 to 49.5 weight percent and a viscosity range of 6 to 8 centipoise; ETHOCEL® 20 which has an ethoxyl content of 48.0 to 49.5 weight percent and a viscosity range of 18 to 22 centipoise; ETHOCEL® 200 which has an ethoxyl content of 48.0 to 49.5 weight percent and a viscosity range of 180 to 220 centipoise. The viscosity was measured as described above.

The ethylcellulose binders are chosen because of their toughness and unusual degree of flexibility. They have good suspending properties for the highly dense dielectric powder. The presence of some hydroxyl groups on the cellulose backbone increases the interaction and dispersion of the metal oxide in the vehicle. Moreover, the permeability of cellulose ethers to $O_2$, $CO_2$ and $H_2O$ are orders of magnitude higher than acrylates, allowing proper diffusion of gases upon burnout or firing.

The solvent may be any substance or combination of substances which solubilize the components of the slip which are volatile under ceramic firing conditions. Preferred solvents include alcohols, ketones, aromatic compounds and halogenated compounds. More preferred solvents include toluene, ethanol, butanol, acetone, methylisobutyl ketone, methyl ethyl ketone, isopropanol, 1,1,1-trichloroethane and benzene. Mixtures of solvents, such as mixtures of methyl ethyl ketone and ethanol, are most preferred. Water can be employed as the solvent when thermoplastic methylcellulose is employed as the binder.

A wetting agent, or surfactant, is optionally employed in the slip composition. The surfactant facilitates the formation of homogeneously uniform slips having desirable spreadability. Surfactants are well-known and a wide variety of surfactants can be employed. Examples of typical wetting agents or surfactants include the amine salts of alkylaryl sulfonates; the alkyl ethers of polyethylene glycol, such as the ethyl ether of polyethylene glycol; alkylaryl polyether alcohols, such as ethylphenyl glycol; polyoxyethylene acetate, or other polyoxyethylene esters. The surfactant or wetting agent preferably is of such a nature that it is volatilized during firing.

A plasticizer is optionally employed in the slip composition. Plasticizers are well-known and a wide range of plasticizers can be employed. Examples of typical plasticizers include mineral oil; glycols, such as propylene glycol; phthalic esters such as dioctyl phthalate and benzyl butyl phthalate; and long-chain aliphatic acids such as oleic acid and stearic acid; and mixtures thereof. The plasticizer serves to enhance the film-forming characteristics of the slip, and to impart flexibility into the green tape at lower temperatures. Preferably, more than one plasticizer is employed. For example, a preferred plasticizer mixture comprises benzyl butyl phthalate, propylene glycol, and oleic acid.

A typical slip composition preferably has the following ranges of components, in weight percent:
  dielectric component from about 25 to about 94;
  binder from about 0.6 to about 33; solvent from about 4 to about 66; optionally, surfactant from 0 to about 11; and
  optionally, plasticizer from 0 to about 20, based on the total weight percent of the slip composition.

More preferred slip compositions have the following ranges of components, in weight percent:
  dielectric component from about 32 to about 78;
  binder from about 1 to about 20; solvent from about 16 to about 58; surfactant from about 0.01 to about 2; and
  plasticizer from about 0.6 to about 11.

Preferred slip compositions have relatively higher amounts of ceramic powders with relatively lower amounts of organic binders and solvent. However, a green tape needs a certain minimum amount of organic binder to maintain a mechanical strength as a free-standing tape, and a slip typically has a minimal amount of solvent to retain the rheological properties for tape-casting. Said properties include the viscosity of the slip and the flow characteristics of the slip under the shear and stress forces of the doctor blade.

Desirably, the slip of the present invention is formulated to have a viscosity which is suitable for the chosen method of applying the slip to a carrier. For example, typical slip compositions used in tape-casting have a viscosity of from about 400 to about 3,000 cps at 25° C. The viscosity of the slip is determined using a Brookfield low-viscosity viscometer using Spindle No. 31 operating at 12 rpm and 25° C. Slips of the desired viscosity and homogeneity are cast or coated into green tapes using methods well-known in the art The green tapes of the present invention can be formed into multilayer capacitors and similar electronic devices using known techniques. For example, green tapes of the present invention can be coated, e.g., by screen stenciling, with a noble metal electrode coating in the desired pattern. The inked tapes can then be stacked to provide alternate dielectric and electrode layers with alternate electrode layers exposed on opposite edges of the stack. The stack can then be compressed under pressure, as is known in the art, and then fired to provide a monolithic multilayer capacitor. The edges with exposed electrodes are metallized with a conductive metal paint. This can be done before the stack is fired, or after such firing, depending upon the firing temperature required and the metal paste utilized. (See U.S. Pat. No. 4,075,681 for an exemplary method of preparing monolithic multilayer capacitors.)

Preferred green tapes have a thickness of from 2.5 to 25 microns; more preferably they have a thickness of from 5 to 18 microns; most preferably they have a thickness of from 5 to 10 microns.

The following preparations and examples are illustrative of the present invention, and are not to be construed as limiting. All parts and percentages are by weight unless otherwise specified. For ease of conversion, note that 1 mil equals 25.4 microns.

EXAMPLE 1 AND COMPARATIVE EXPERIMENTS 1-2

A powder suspension is prepared by dispersing in toluene a commercial dielectric powder designated Z5UBL702, available from Solid State Dielectrics Company, Sun Valley, Calif., U.S. The suspension is stirred constantly.

The following general procedure is followed for Example 1 and comparative Experiments 1-2. An aliquot of the suspension described hereinabove is weighed out. The aliquot is allowed to settle for thirty (30) minutes. Then, the supernatant liquid is siphoned off to enrich the suspension so that it contains approximately a 1:1 weight ratio of powder and toluene. The enriched suspension is vigorously mixed with an ethylcellulose solution prepared using a mixture of toluene, isopropanol, and plasticizers. Three different types of ethylcellulose are employed, i.e., three slips are prepared. Each slip is cast on a glass plate using a doctor blade. The cast suspensions are dried at room temperature to give green tapes having thicknesses of from 0.3 to 1.2 mils (7.6–30.5 microns). The results are summarized in Table I.

TABLE I

| Run[1] | Binder used[2] | Binder viscosity[2] | Ceramic powder (g) | Plasticizers (g) DOP[3] | PG[4](g) | Binder | Solvent toluene | isopropanol | Dry Tape Properties |
|---|---|---|---|---|---|---|---|---|---|
| C.E. 1 | E-7 | 7 cps | 53.3 | 3.3 | 0.67 | 12.5 | 69.2 | 15.6 | Mud Cracks |
| C.E. 2 | E-20 | 20 cps | 33.3 | 2.1 | 0.42 | 6.3 | 53.1 | 11.9 | Mud Cracks |
| Ex. 1 | E-45 | 45 cps | 41.8 | 1.93 | 0.07 | 6.3 | 60.6 | 2.3 | Flexible, Free-standing Film |

[1]C.E. equals Comparative Experiment
[2]All binders used are ETHOCELS which are ethylcellulose products available from The Dow Chemical Company. Binder viscosity is measured as described hereinabove.
[3]Dioctyl phthalate
[4]Propylene glycol The green tape prepared using ETHOCEL® 45 is more suitable for use in preparing dielectric components than are green tapes prepared using ETHOCEL® 7 and ETHOCEL® 20.

EXAMPLE 2

A slip having the following composition (in grams) is prepared:

| | |
|---|---|
| Dielectric Ceramic powder (Z5UBL702) | 800.0 |
| ETHOCEL ® 45 | 68.0 |
| Surfactant | 4.0 |
| Atlas G3300 (I.C.I. America), amine salt of alkylarylsulfonate | |
| Plasticizer | |
| benzyl butyl phthalate | 46.4 |
| butanetriol | 3.6 |
| Solvent | |
| methyl ethyl ketone | 486.0 |
| isopropanol | 93.6 |
| ethanol | 96.0 |
| Total | 1597.6 |

In the preparation of the slip, the dielectric powder is ball-milled in a mixture of methyl ethyl ketone and isopropanol for six hours using three-eighths inch (0.95 cm) zirconia balls. ETHOCEL® 45 is dissolved separately in a mixture of methyl ethyl ketone and isopropanol together with benzyl butyl phthalate and butanetriol. The ETHOCEL® 45 solution is then poured into the mill jar, and total slip is milled for an additional twenty hours. The viscosity of the slip is 800 cps. It is cast on a glass plate using a doctor blade. The cast slip is dried to give a green tape having a thickness of 0.3 mil (7.6 microns). The tape easily peels off the glass plate and is observed to have good mechanical strength and flexibility.

When the above procedure is repeated using 800.0 g of Z5U502L or 800.0 g of X7P182H (commercial dielectric powders available from Tam Ceramics, Niagara Falls, N.Y.), the results are comparable to those obtained for Z5UBL702 above.

EXAMPLE 3

The slip of Example 2 is cast on a polypropylene tape using a doctor blade. The cast slip is dried to give a dry green tape having a thickness of 0.9 mil (22.9 microns). The dry green tape is stripped continuously from the substrate tape. Rectangular-shaped two-inch by four-inch (5 by 10 cm) sheets are punched out of the green tape and are screen-printed with a palladium-containing electrode ink. About 20 layers of sheets with electrode are stacked and backed up with 10 blank sheets on either side to increase the integrity of the resulting laminate. The laminate is hot pressed at 70° C. and 2,500 psig. Green chips diced out of the laminates are subjected to polymer burnout and sintering. Good ceramic chips are obtained with no delamination. Dielectric properties of the chips are within the specifications of Z5U as determined by the Electronic Industries Association.

EXAMPLE 4

A slip having the following composition (in grams) is prepared:

| | |
|---|---|
| Dielectric ceramic powder (Z5U502L) | 800.0 |
| ETHOCEL ® 100 | 63.0 |
| Surfactant | 4.0 |
| Atlas G3300 (I.C.I. America), amine salt of alkylarylsulfonate | |
| Plasticizer | |
| benzyl butyl phthalate | 80.0 |
| oleic acid | 16.0 |
| mineral oil | 16.0 |
| Solvent | |
| 1,1,1-trichloroethane | 814.0 |
| Total | 1793.0 |

In the preparation of the slip, the dielectric powder is ball-milled in a mixture of 1,1,1-trichloroethane, surfactant and mineral oil for three hours using three-eighths-inch (0.95 cm) zirconia balls. ETHOCEL® 100 is dissolved separately in a mixture of 1,1,1-trichloroethane with benzyl butyl phthalate and oleic acid. The ETHOCEL® 100 solution is poured into the mill jar, and the total slip is milled for an additional six hours. The slip is cast on a glass plate using a doctor blade. The cast slip is dried at room temperature to give green tapes having a thickness of from 0.20 mil (5 microns) to 3.0 mils (75 microns). The tape easily peels off the glass plate and is observed to have good mechanical strength and flexibility.

EXAMPLE 5

A slip is prepared having the same composition and in the same manner as the slip of Example 4, except that ETHOCEL® 200 is used for the ETHOCEL® 100. The slip is cast on a glass plate using a doctor blade and dried at room temperature to give green tapes less than 25 microns in thickness. The tapes are free-standing and flexible.

Surprisingly, it can be seen from the preceding examples and comparative experiments that the use of specific ethylcellulose binders results in very thin, green tapes having outstanding physical properties, whereas the use of ethylcellulose binders not within the specifications described herein does not give green tapes having the desired physical properties.

What is claimed is:

1. A green ceramic precursor tape which comprises a free-standing, flexible layer having a thickness not greater than about 25 microns and prepared from a slip composition having:
    (a) a dielectric component in an amount sufficient to provide the resulting thin film with the desired dielectric properties;
    (b) a binder comprising at least one alkylcellulose ether or hydroxyalkylcellulose ether in an amount sufficient to bind the dielectric material into the thin film upon the removal of the solvent; and
    (c) a solvent in an amount sufficient to solubilize the dielectric component and the binder and to provide the slip composition with the viscosity required to form the thin film.

2. A tape of claim 1 wherein the dielectric component is barium titanate.

3. A tape of claim 1 wherein the alkylcellulose ether is ethylcellulose.

4. A tape of claim 3 wherein the ethylcellulose has an ethoxyl content of from 44 to 53 weight percent and the viscosity is greater than about 40 centipoise.

5. A tape of claim 4 wherein the ethylcellulose has an ethoxyl content of from 44 to about 50 weight percent and the viscosity is greater than about 40 centipoise.

6. A tape of claim 5 wherein the ethoxyl content is from 48 to about 49.5 weight percent and the viscosity is from 40 to about 60 centipoise, the viscosity being that of a 5 weight percent solution measured at 25° C. in an Ubbelohde viscometer with a solvent which is 80 weight percent toluene and 20 weight percent ethanol.

7. A tape of claim 6 wherein the ethylcellulose is ETHOCEL ® 45 brand ethylcellulose.

8. A tape of claim 5 wherein the ethoxyl content is from about 48 to about 49.5 weight percent and the viscosity is from about 90 to about 110 centipoise, the viscosity being that of a 5 weight percent solution measured at 25° C. in an Ubbelohde viscometer with a solvent which is 80 weight percent toluene and 20 weight percent ethanol.

9. A tape of claim 8 wherein the ethylcellulose is ETHOCEL ® 100 brand ethylcellulose.

10. A tape of claim 4 having a thickness of from about 5 to about 10 microns.

11. A tape of claim 1 wherein the slip contains a wetting agent or surfactant.

12. A tape of claim 1 wherein the slip contains a plasticizer.

13. A capacitor prepared using a flexible, free-standing green tape having a thickness not greater than 25 microns, the green tape being prepared from a slip comprising:
    (a) a dielectric component in an amount sufficient to provide the resulting thin film with the desired dielectric properties;
    (b) a binder comprising at least one alkylcellulose ether or hydroxyalkylcellulose ether in an amount sufficient to bind the dielectric material into the thin film upon removal of the solvent; and
    (c) a solvent in an amount sufficient to solubilize the dielectric component and the binder and to provide the slip composition with the viscosity required to form the thin film.

14. A capacitor of claim 13 wherein the cellulosic resin is ethylcellulose.

15. A capacitor prepared using a flexible, free-standing green tape having a thickness not greater than 25 microns, the green tape being prepared from a slip comprising:
    (a) a dielectric component of barium titanate in an amount sufficient to provide the resulting thin film with the desired dielectric properties;
    (b) a binder of ethylcellulose in an amount sufficient to bind the dielectric material into the thin film upon removal of the solvent; the ethylcellulose having an ethoxyl content of from about 48 to about 49.5 weight percent and a viscosity from about 40 to about 60 centipoise, the viscosity being that of a 5 weight percent solution measured at 25° C. in an Ubbelohde viscometer with a solvent which is 80 percent toluene and 20 weight percent ethanol; and
    (c) a solvent in an amount sufficient to solubilize the dielectric component and the binder and to provide the slip composition with the viscosity required to form the thin film.

16. A capacitor prepared using a flexible, free-standing green tape having a thickness not greater than 25 microns, the green tape being prepared from a slip comprising:
    (a) a dielectric component comprising barium titanate in an amount sufficient to provide the resulting thin film with the desired dielectric properties;
    (b) a binder comprising ethylcellulose in an amount sufficient to bind the dielectric material into the thin film upon removal of the solvent; the ethylcellulose having an ethoxyl content of from about 48 to about 49.5 weight percent and a viscosity from about 90 to about 110 centipoise, the viscosity being that of a 5 weight percent solution measured at 25° C. in an Ubbelohde viscometer with a solvent which is 80 weight percent toluene and 20 weight percent ethanol; and
    (c) a solvent in an amount sufficient to solubilize the dielectric component and the binder and to provide the slip composition with the viscosity required to form the thin film.

17. A green ceramic precursor tape which comprises a free-standing, flexible unsupported layer having a thickness of from 5 to 18 microns and prepared from a slip composition having:
    (a) a dielectric component in an amount sufficient to provide the resulting thin film with the desired dielectric properties;
    (b) a binder having at least one cellulosic resin in an amount sufficient to bind the dielectric material into the thin film upon removal of the solvent; and
    (c) a solvent in an amount sufficient to solubilize the dielectric component and the binder and to provide the slip composition with the viscosity required to form the thin film.

18. A tape of claim 17 having a thickness of from about 5 to about 10 microns.

19. A capacitor prepared using a flexible, free-standing green unsupported tape having a thickness of from 5 to 18 microns, the green tape being prepared from a slip comprising:
    (a) a dielectric component in an amount sufficient to provide the resulting thin film with the desired dielectric properties;
    (b) a binder having at least one cellulosic resin in an amount sufficient to bind the dielectric material into the thin film upon removal of the solvent; and
    (c) a solvent in an amount sufficient to solubilize the dielectric component and the binder and to provide the slip composition with the viscosity required to form the thin film.

* * * * *